Oct. 19, 1937.  F. LEHMHAUS  2,096,614
PROTECTIVE ARRANGEMENT FOR ELECTRIC SYSTEMS
Filed May 29, 1936
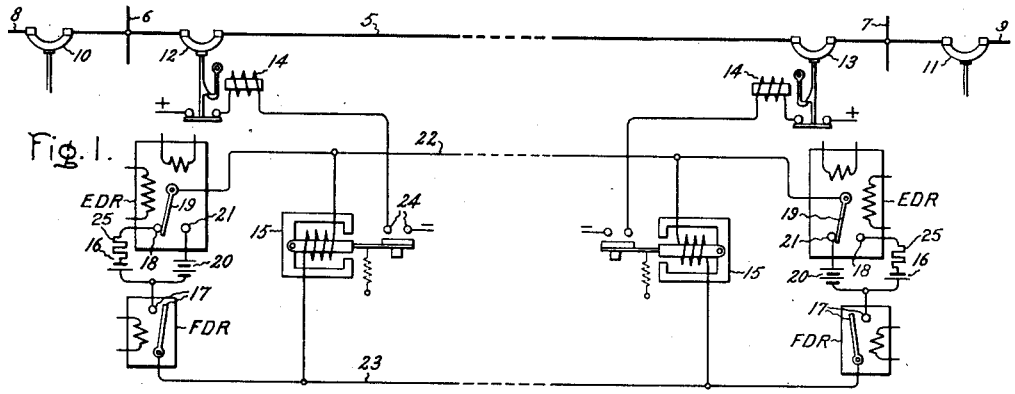
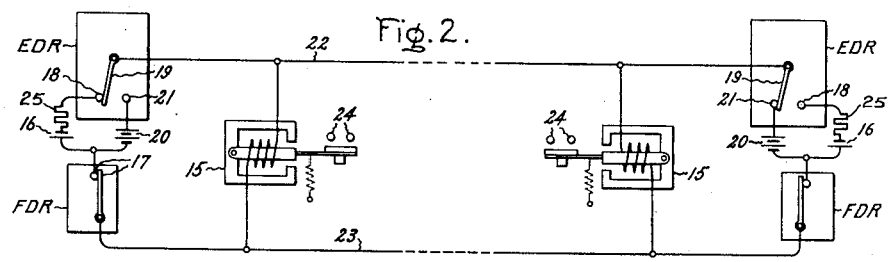
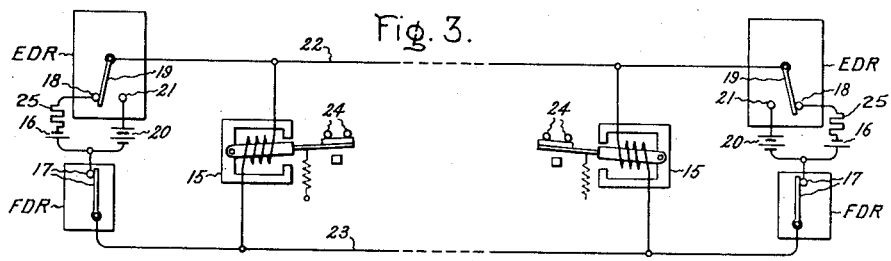
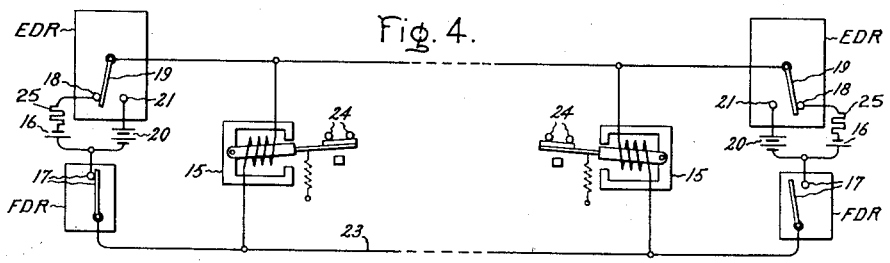
Inventor:
Friedrich Lehmhaus,
by Harry E. Dunham
His Attorney.

Patented Oct. 19, 1937

2,096,614

UNITED STATES PATENT OFFICE 2,096,614

PROTECTIVE ARRANGEMENT FOR ELECTRIC SYSTEMS

Friedrich Lehmhaus, Dresden, Germany, assignor to General Electric Company, a corporation of New York Application May 29, 1936, Serial No. 82,620
In Germany June 17, 1935

8 Claims. (Cl. 175—294)

My invention relates to improvements in protective arrangements for electric systems and more particularly to improvements in electric arrangements whereby any section of an electric system can be protected independently of the other sections.

In some protective arrangements, selectivity is obtained by comparing the directions of energy flow at the ends of a section of the system on the occurrence of a fault so as to isolate the section only when the fault is in the section. Some of these arrangements are subject to the disadvantage of failure to operate when the section is supplied from one end only and also when, although supplied from the other end, there is not sufficient energy flow to effect the correct operation of the fault-responsive devices. An object of my invention is to eliminate this disadvantage by providing an improved selective protective arrangement wherein on the occurrence of a fault on the system, suitable means at one end of the section tends to effect the disconnection of both ends but will be prevented from so doing in case of external faults. This may be accomplished by controlling, in accordance with my invention, the direction of flow of current in a local control circuit in dependence on whether the fault is internal or external to the section. This and other objects of my invention will appear in more detail hereinafter.

My invention will be better understood from the accompanying sheet of drawing and its scope will be pointed out in the appended claims.

In the accompanying sheet of drawings, Fig. 1 illustrates diagrammatically an embodiment of my invention as applied to a section of an electric system shown in single phase for the sake of clearness; Fig. 2 illustrates diagrammatically the control devices and circuits for a fault external to the section; Fig. 3 is similar to Fig. 2 except that the control devices and circuits are shown for an internal fault with energy supplied to both ends of the section; and Fig. 4 is similar to Fig. 3, except that the control devices and circuits are shown under internal fault conditions with no energy supplied at one end.

In the embodiment of my invention shown in Fig. 1, a portion of an electric system is schematically illustrated single phase, by a section of a power line 5 extending between buses 6 and 7, to which sections 8 and 9 may be connected through circuit breakers 10 and 11, as is well known to the art. For isolating the section 5 on the occurrence of faults, there are provided suitable circuit interrupting means illustrated as latch closed circuit breakers 12 and 13 having trip coils 14.

For controlling the circuit breakers 12 and 13 so as to isolate the section 5 only in case of an internal fault, I provide means whose operation is dependent on the direction of flow of current in a local control circuit which is in turn controlled on the occurrence of faults in response to the fault currents and the relative directions of energy flow at the ends of the section. The particular local circuit directional responsive means chosen to illustrate my invention may be a polarized relay 15, examples of which are well known to the art. This relay may be energized from a suitable source such as a battery 16 through the contacts 17 of a fault detector relay FDR such as an over-current relay; an undervoltage relay or an impedance relay, and contacts 18 and 19 of an energy directional relay EDR, which is closed on the contact 18 when energy flows from the station bus 6 or 7 into the power line section 5. A preventive operation circuit for the polarized relay 15 may be energized from a suitable source such as the battery 20 through the contacts 17 of the fault detector relay FDR and the contacts 19, 21 of the energy directional relay EDR. The source 20 is connected in reverse polarity with reference to the source 16. The voltage of the source 20 is such that when the electromotive forces of a source 16 at one station and a source 20 at the other station are simultaneously impressed on the winding of the relay 15, the tripping operation thereof is prevented. The local control circuit at each station which includes the energizing winding of the polarized relay 15 and the contacts of the fault detector FDR and energy directional EDR relays at each station is interconnected to the local control circuit at the other station by suitable conducting means such as pilot wires 22 and 23, as shown.

If it be assumed that conditions are normal and that the contacts 19, 18 are closed or that the direction of flow of power is from left to right at both stations 6 and 7, then the parts may be positioned as shown in Fig. 1. However, if a fault occurs to the right of station 7 of sufficient intensity to cause operation of the fault detector relays FDR, then the local control circuit at each station will be completed from the source 16 at the station 6 and from the source 20 at the station 7 as shown in Fig. 2. Current thus tends to flow from the source 16 at station 6 to the windings of both of the polarized relays 15 in a direction to tend to cause these relays to close their contacts and trip the circuit breakers 12 and 13 at the respective stations 6 and 7. Since, however, the voltage source 20 at station 7 is also connected through the fault responsive relay FDR in reverse polarity to the windings of the polarized relays 15, the windings of these relays are energized by a current in a direction to maintain their trip circuit contacts 24 open. Consequently, no tripping can occur.

In order to avoid a short circuit of the sources 16 at one station and 20 at the other when connected in series through the pilot wires 22 and 23, in case of an external fault, and also at the same time, to insure correct operation of the relay 15 at the station where the source 16 is connected, a suitable resistance 25 may be connected, for example, between the contact 18 and the source 16. The value of this resistance should be such that the voltage across the relay 15 at the end where the source 16 is connected in circuit by the fault responsive relays should be insufficient or of such polarity as not to operate the relay 15.

If, however, a fault occurs within the section 5 and the section is supplied with sufficient energy at both ends to cause the operation of the fault detector relays FDR and the energy directional relays EDR, then the local circuit at each station will be connected to the local source 16, whereby to send an energizing current through the local polarized relay 15 in a direction to cause it to close its contacts 24 as shown in Fig. 3 whereby to trip its own circuit breaker.

In case of an internal fault with energy supplied only from one end of the section 5, for example station 6, or insufficient energy supplied to the section from station 7 to effect operation of the fault detector relay FDR at this station, then the parts will be positioned as shown in Fig. 4. In this case, the energizing windings of the polarized relay 15 at each station are energized from the local source 16 at the station into which energy is fed because the windings of both of the polarized relays are connected in parallel to this source. Inasmuch as the direction of current flow in the windings of the polarized relays 15 is such as to cause their tripping operation, the disconnection of the section will be effected.

What I claim as new and desire to secure by Letters Patent of the United States is:

1. A protective arrangement for an electric circuit comprising interrupting means at each of two points of the circuit for isolating the portion of the circuit between said points, and means for controlling the opening of said circuit interrupting means including means at one point of the circuit tending to effect the opening of the circuit interrupting means at both points on the occurrence of a fault on the circuit on one side of said one point including fault-responsive relay means connected to be energized from said circuit and directional relay means connected to be controlled by said fault-responsive relay means, and means at the other point for controlling the operation of said directional relay means whereby to prevent the opening of the circuit interrupting means on the occurrence of a fault external to the portion of the circuit between said points and on the same side of said one point.

2. A protective arrangement for an electric circuit comprising interrupting means at each of two points of the circuit for isolating the portion of the circuit between said points, and means at each point tending to effect the opening of the circuit interrupting means at both points on the occurrence of a fault on one side of the respective point including fault-responsive relay means connected to be energized from said circuit and directional relay means connected to be controlled by said fault-responsive relay means and means for controlling the operation of said directional relay means whereby to prevent the opening of the circuit interrupting means at both points on the occurrence of an external fault.

3. A protective arrangement for an electric power circuit comprising interrupting means at each of two points of the circuit for isolating the portion of the circuit between said points, and means at each point tending to effect the opening of the circuit interrupting means at both points on the occurrence of a fault, including fault-responsive relay means connected to be energized from the circuit and directional relay means controlled by said fault-responsive relay means for preventing the opening of said circuit interrupting means on the occurrence of an external fault.

4. A protective arrangement for an electric power circuit comprising means at each of two points of the circuit for interrupting the circuit whereby to isolate the portion of the circuit between said points, and means for controlling said interrupting means whereby to effect an interrupting operation on the occurrence of a fault between said points, including a current directional responsive means at each of said points, means at each of said points for energizing said current directional responsive means, and fault responsive means at each point for controlling the direction of current flow through said current directional responsive means including an energy directional relay connected to be energized from the circuit.

5. A protective arrangement for an electric power circuit comprising interrupting means at each of two points of the circuit for isolating the portion of the circuit between said points, and means for controlling said interrupting means to effect an interrupting operation thereof on the occurrence of a fault between said points, including a control circuit at each point, means for energizing said control circuits, means for interconnecting said control circuits, and fault-responsive means for selectively controlling the direction of flow of current in a predetermined portion of each of said control circuits in dependence on the location of a fault on said power circuit including an energy directional relay at each point connected to be energized from said power circuit.

6. In combination an electric power circuit, a local circuit, a device to be operated connected in said local circuit, means for impressing on said circuit an electromotive force tending to operate said device, including a fault detector relay and an energy directional relay connected to be energized from the power circuit at one point thereof, and means at another point of the circuit for impressing on said device another electromotive force for preventing the operation of the device on the occurrence of a fault external to the portion of the circuit between said points.

7. A protective arrangement for an electric power circuit comprising means at each of two points of the circuit for interrupting the circuit whereby to isolate the portion of the circuit between said points, and means for selectively controlling said interrupting means to effect an interrupting operation thereof only on the occurrence of a fault between said points, including a local control circuit at each point, means for energizing said control circuits, means for interconnecting said control circuits, and means for selectively controlling the direction of flow of current in a predetermined portion of each of said control circuits in dependence on the location of a fault on said power circuit, including a fault detector relay and an energy directional relay at each of said points connected to be energized from said power circuit.

8. A protective arrangement for an electric circuit comprising interrupting means at each of two points of the circuit for isolating the portion of the circuit between said points, and means for controlling said interrupting means to effect an interrupting operation thereof on the occurrence of a fault between said points, including a control circuit at each point, a directional relay at each of said points having its winding connected in the control circuit at the point, means for energizing said control circuits, means for interconnecting said control circuits, and fault responsive means for selectively controlling the direction of flow of current in the windings of said directional relays in dependence on the location of a fault on said power circuit, including an energy directional relay and a fault detector relay at each point connected to be energized from said power circuit.

FRIEDRICH LEHMHAUS.